(12) United States Patent
McFarland et al.

(10) Patent No.: US 12,485,617 B2
(45) Date of Patent: Dec. 2, 2025

(54) SYSTEMS AND METHODS FOR CREATING A POWDER REMOVAL TOOL VIA ADDITIVE MANUFACTURING

(71) Applicant: GM Global Technology Operations LLC, Detroit, MI (US)

(72) Inventors: Adam McFarland, Royal Oak, MI (US); Adam John Campbell, Rochester, MI (US); Steven Lewis Corzyk, Farmington Hills, MI (US); Patrick J. Eding, Fremont, MI (US); Dale Miller, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 156 days.

(21) Appl. No.: 18/474,652

(22) Filed: Sep. 26, 2023

(65) Prior Publication Data

US 2025/0100224 A1    Mar. 27, 2025

(51) Int. Cl.
| | |
|---|---|
| *B29C 64/35* | (2017.01) |
| *B29C 64/141* | (2017.01) |
| *B29C 64/386* | (2017.01) |
| *B33Y 10/00* | (2015.01) |
| *B33Y 40/20* | (2020.01) |
| *B33Y 50/00* | (2015.01) |

(52) U.S. Cl.
CPC ............ *B29C 64/35* (2017.08); *B29C 64/386* (2017.08); *B33Y 10/00* (2014.12); *B33Y 40/20* (2020.01); *B33Y 50/00* (2014.12); *B29C 64/141* (2017.08)

(58) Field of Classification Search
CPC ..... B29C 64/35; B29C 64/386; B29C 64/141; B33Y 10/00; B33Y 40/20; B33Y 50/00; B33Y 40/00; B33Y 80/00
See application file for complete search history.

(56) References Cited

U.S. PATENT DOCUMENTS

| | | | |
|---|---|---|---|
| 2017/0197284 A1* | 7/2017 | Twelves, Jr. ............ | B22F 10/28 |
| 2017/0197362 A1* | 7/2017 | Butcher ................. | B22F 10/66 |
| 2017/0197364 A1* | 7/2017 | Butcher ................. | B26D 1/553 |
| 2019/0358833 A1* | 11/2019 | Graham ................. | B25J 18/06 |

FOREIGN PATENT DOCUMENTS

| | | | | |
|---|---|---|---|---|
| DE | 102010019447 A1 | 11/2011 | | |
| GB | 2517490 A | * | 2/2015 | ............ B22F 3/1055 |

* cited by examiner

*Primary Examiner* — Nahida Sultana
(74) *Attorney, Agent, or Firm* — Honigman LLP; Matthew H. Szalach; Jonathan P. O'Brien

(57) ABSTRACT

A method for removing excess powder from a part for a vehicle during an additive manufacturing process, comprises defining parameters for a part, defining parameters for a removal tool comprising a plurality of links to create a chain-like structure, simultaneously creating the part and the removal tool via additive manufacturing, wherein the part defines an interior passageway and the removal tool is created within the interior passageway and, upon completion of the creation of the part and the removal tool, the removal tool is surrounded by excess powder in the interior passageway, and wherein each link of the plurality of links are created with a gap between adjacent links of the plurality of links, and removing the removal tool from the interior passageway, forcing at least some of the excess powder out of the interior passageway.

20 Claims, 9 Drawing Sheets

SYSTEMS AND METHODS FOR CREATING A POWDER REMOVAL TOOL VIA ADDITIVE MANUFACTURING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against present disclosure.

The present disclosure relates generally to systems and methods for creating a powder removal tool via additive manufacturing. Specifically, the present disclosure relates to powder bed polymer additive manufacturing. Post printing, residual powder must be removed from parts created by additive manufacturing. As powder compacts in the printing process, removal of the powder may be challenging when parts have long, deep, or complex channels or pathways, which are difficult to reach.

Accordingly, there is room for improvement for powder removal tools in parts created by additive manufacturing.

SUMMARY

One aspect of the disclosure provides a method for removing excess powder from a part during an additive manufacturing process. The method comprising defining parameters for a part, defining parameters for a removal tool comprising a plurality of links to create a chain-like structure, and simultaneously creating the part and the removal tool via additive manufacturing. The part defines an interior passageway and the removal tool is created within the interior passageway and, upon completion of the creation of the part and the removal tool, the removal tool is surrounded by excess powder in the interior passageway. Each link of the plurality of links is created with a gap between adjacent links of the plurality of links. Removing the removal tool from the interior passageway forces at least some of the excess powder out of the interior passageway. The method also includes performing at least one of the following operations to remove any remaining excess powder from the interior passageway: providing a robotic appendage for powder removal, vibration powder removal, air blasting in the interior passageway, or media blasting in the interior passageway.

Implementations of the disclosure may include one or more of the following optional features. In some implementations, each link of the plurality of links has a generally helix shape.

The part may be for a vehicle. The vehicle may be an automobile.

The chain-like structure of the removal tool may be created into a spiral configuration throughout the interior passageway. The spiral configuration of the removal tool may include a plurality of revolutions, wherein each revolution of the plurality of revolutions is spaced apart from adjacent revolutions along a center of the spiral configuration.

The interior passageway may be defined by interior sidewalls of the part. The removal tool may be spaced from the interior sidewalls.

Another aspect of the disclosure provides a method for removing excess powder from a part during an additive manufacturing process. The method comprising defining parameters for a part, defining parameters for a removal tool comprising a plurality of links to create a chain-like structure, and simultaneously creating the part and the removal tool via additive manufacturing. The part defines an interior passageway and the removal tool is created within the interior passageway. Removing the removal tool from the interior passageway forces at least some of the excess powder out of the interior passageway.

Implementations of the disclosure may include one or more of the following optional features. In some implementations, each link of the plurality of links has a generally helix shape.

The part may be for an automobile.

The method may further comprise performing at least one of the following operations to remove any remaining excess powder from the interior passageway: providing a robotic appendage for powder removal, vibration powder removal, air blasting in the interior passageway, or media blasting in the interior passageway.

The chain-like structure of the removal tool may be created into a spiral configuration throughout the interior passageway.

The spiral configuration of the removal tool may include a plurality of revolutions, wherein each revolution of the plurality of revolutions is spaced apart from adjacent revolutions along a center of the spiral configuration.

The interior passageway may be defined by interior sidewalls of the part. The removal tool may be spaced from the interior sidewalls.

Another aspect of the disclosure provides a method for removing excess powder from a part for a vehicle during an additive manufacturing process. The method comprising defining parameters for a part, defining parameters for a removal tool comprising a plurality of links to create a chain-like structure, and simultaneously creating the part and the removal tool via additive manufacturing. The part defines an interior passageway and the removal tool is created within the interior passageway. Upon completion of the creation of the part and the removal tool, the removal tool is surrounded by excess powder in the interior passageway. Each link of the plurality of links is created with a gap between adjacent links of the plurality of links. Removing the removal tool from the interior passageway forces at least some of the excess powder out of the interior passageway.

Implementations of the disclosure may include one or more of the following optional features. In some implementations, each link of the plurality of links has a generally helix shape.

The chain-like structure of the removal tool may be created into a spiral configuration throughout the interior passageway.

The spiral configuration of the removal tool may include a plurality of revolutions, wherein each revolution of the plurality of revolutions is spaced apart from the adjacent revolution along a center of the spiral configuration.

The method may further comprise performing at least one of the following operations to remove any remaining excess powder from the interior passageway: providing a robotic appendage for powder removal, vibration powder removal, air blasting in the interior passageway, or media blasting in the interior passageway.

The details of one or more implementations of the disclosure are set forth in the accompanying drawings and the description below. Other aspects, features, and advantages will be apparent from the description and drawings, and from the claims.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

Figure 1:
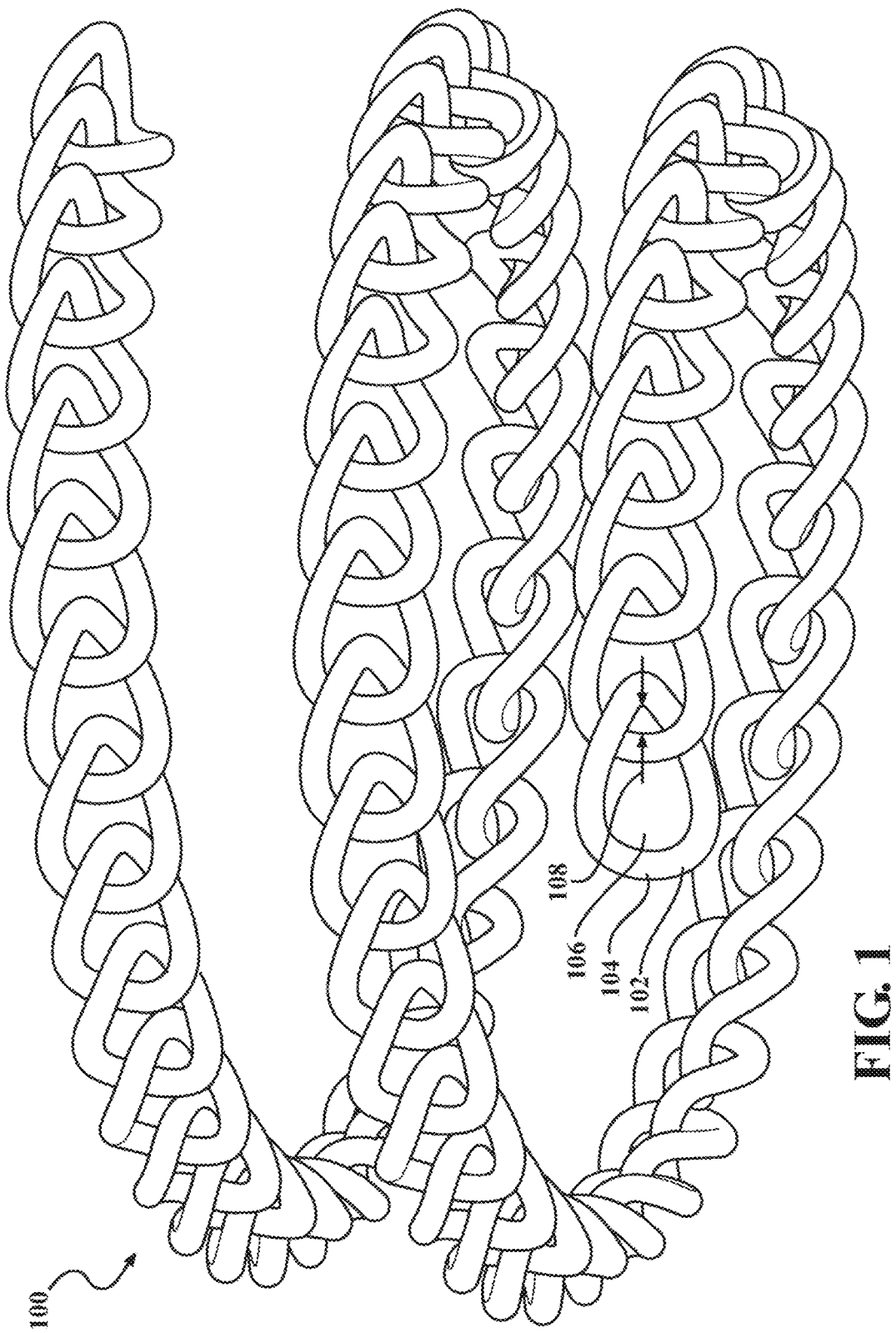
FIG. 1 is a perspective view of an exemplary powder removal tool in accordance with the teachings of the present disclosure.

Referring to FIG. 1, a powder removal tool 100 is generally shown. The powder removal tool 100 comprises a plurality of links 102 that link together to form a chain. In some implementations, the chain is printed into a generally spiral configuration. That is, the chain defines a central void and the chain wraps around the central void with each successive layer, step, or row of the chain being spaced from an adjacent layer, step, or row along the central void by a gap 110. The gap 110 prevents the links 102 from fusing with one another during the additive manufacturing process.

Each link 102 includes a body portion 104 that defines a central cavity 106. The links 102 are connected to one another by the body portion 104 of one link extending through the central cavity 106 of an adjacent link 102. In some implementations, as shown in FIGS. 1-4, the links 106 may comprise a generally helix shape. The links 102 are printed with a gap 108 between the body portion 104 of one link being spaced from the body portion 104 of an adjacent link 102. The gap 108 prevents the links 102 from fusing with one another during the additive manufacturing process.

Figure 2:
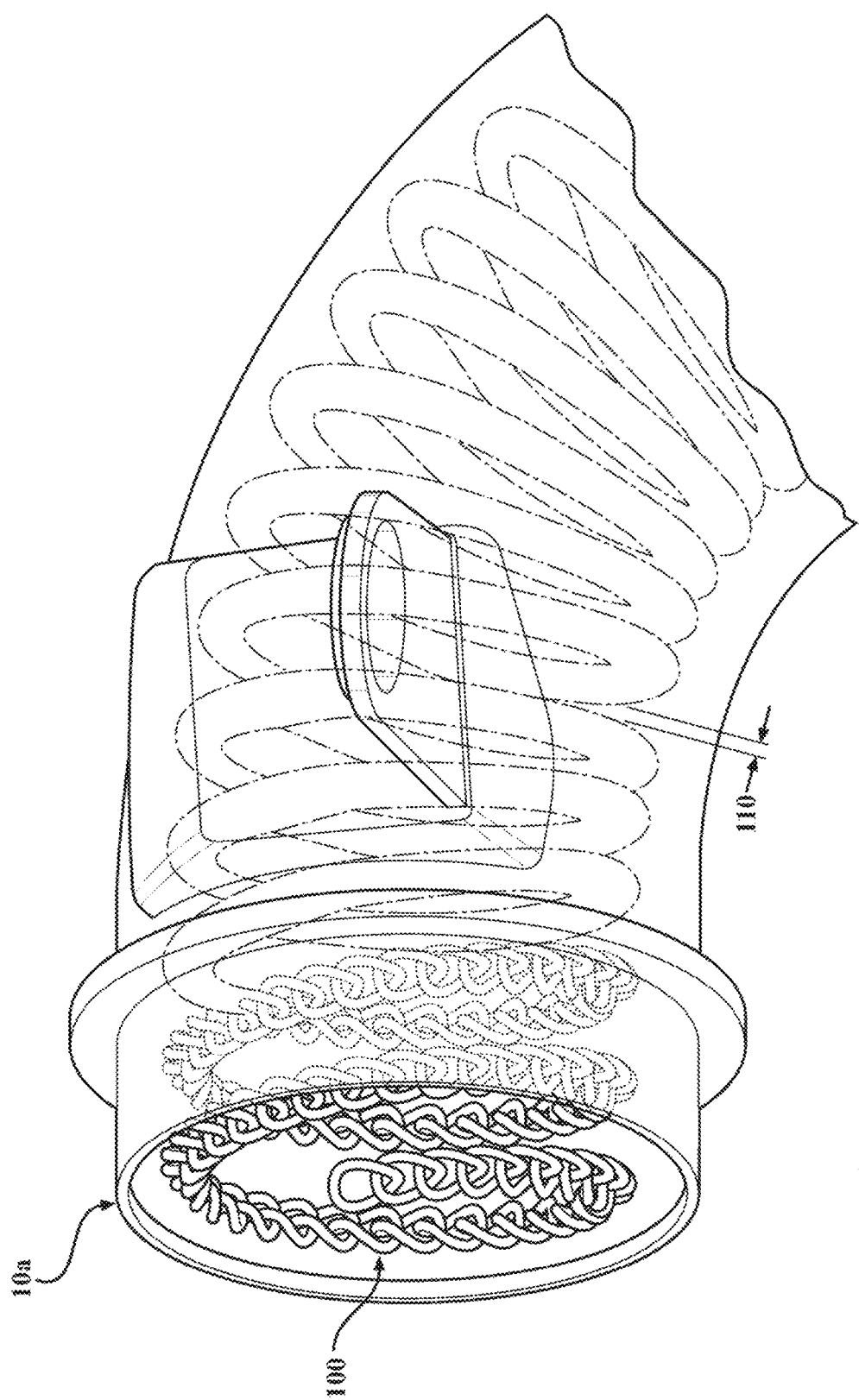
FIG. 2 is a perspective view of the exemplary powder removal tool of FIG. 1 disposed within an exemplary part.
Figure 3:
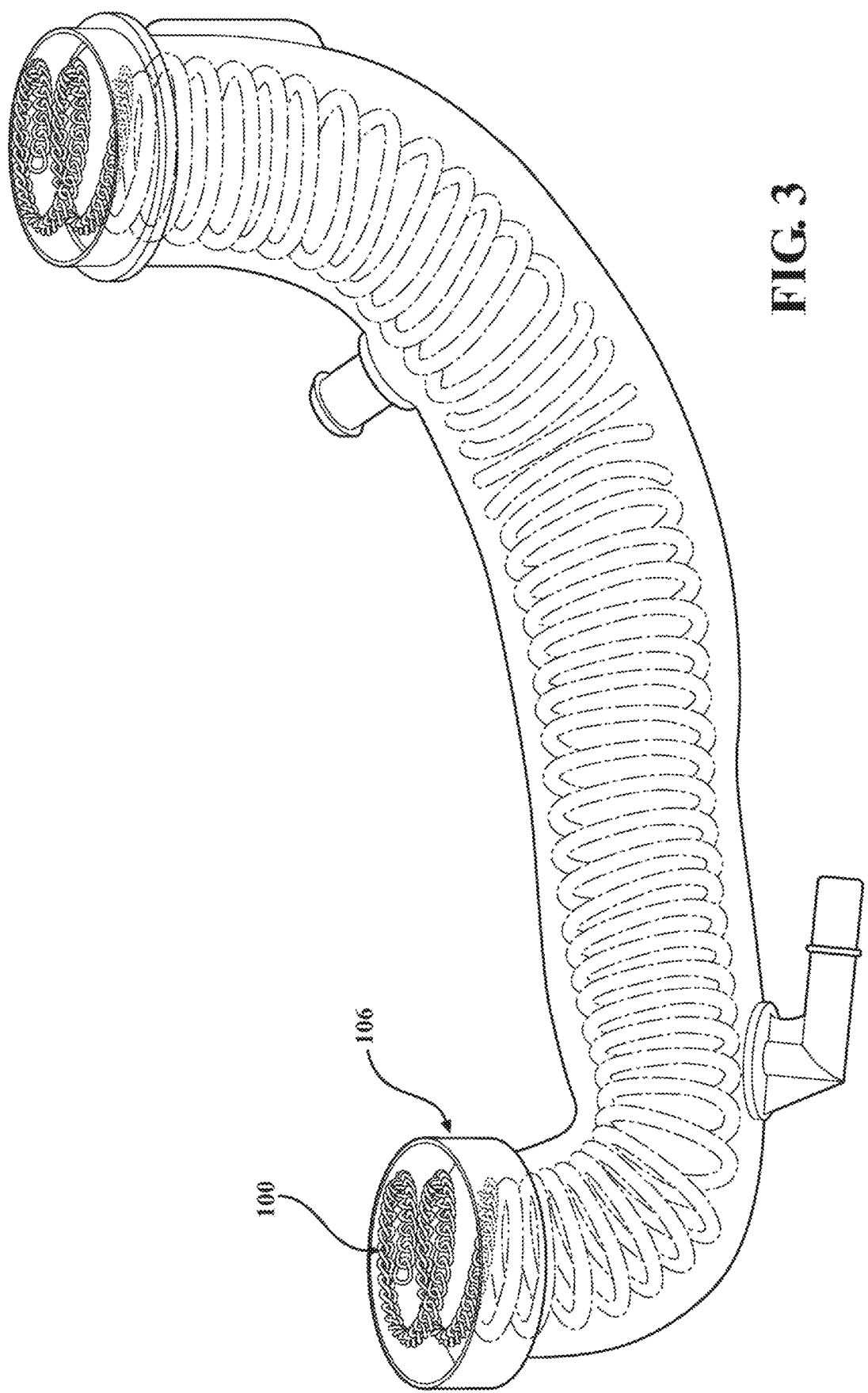
FIG. 3 is a perspective view of the exemplary powder removal tool of FIG. 1 disposed within an exemplary part.
Figure 4:
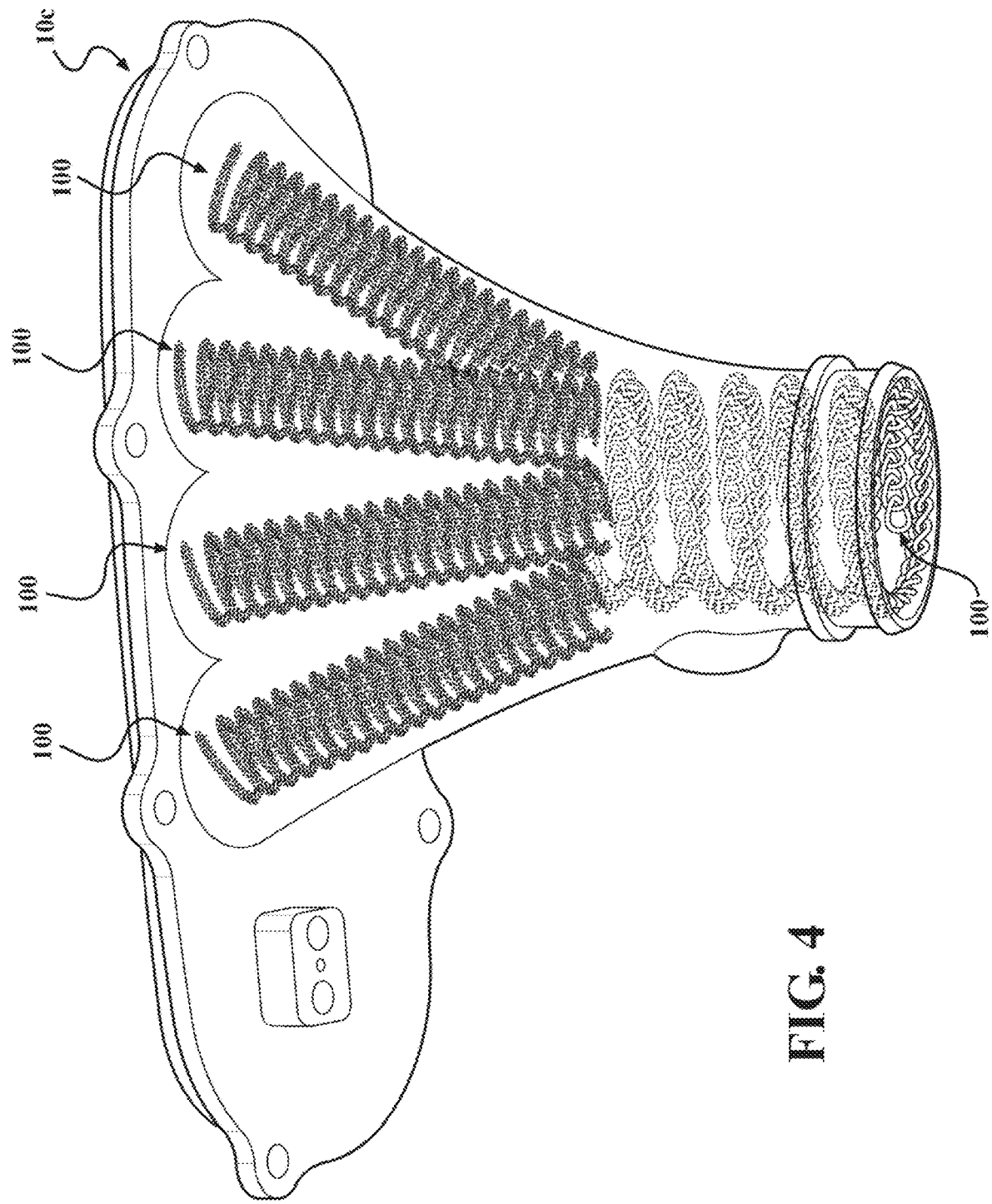
FIG. 4 is a perspective view of the exemplary powder removal tool of FIG. 1 disposed within an exemplary part.

Referring to FIGS. 2-4, the powder removal tool 100 is printed-in-place within a part 10, 10a-c via additive manufacturing, which greatly reduces a required de-powdering effort following formation of the part 10, 10a-c. The part 10 may be a part for a vehicle, which may be an automobile. As will be appreciated, the vehicle may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain configurations. The vehicle may also comprise a truck, a watercraft, an aircraft, and/or one or more other types of vehicles. In other implementations, the part 10 may be for any suitable application, including, but not limited to, consumer products, medical products, etc.

The part 10 may include one or more interior passageways 12. The interior passageways 12 may be ducts, channels, chambers, or any other suitable passageway defined by interior sidewalls 14. By printing the powder removal tool 100 in a coil/helix form factor, such that it follows the interior sidewalls 14 of the interior passageway 12, powder can be removed by simply pulling on the powder removal tool 100 from the outside of the part 10. The powder removal tool 100 reduces the labor required to remove bulk powder by loosening small amounts of powder with every link (as opposed to large amounts all at once), thus, minimizing the force required and relative strength requirements of the powder removal tool 100. The powder removal tool 100 also removes small amounts of powder close to the interior sidewalls 14 of the interior passageways 12, thus, freeing the bulk central powder mass from the interior passageways 12. The powder removal tool 100 may also reduce waste, be integrated with automation equipment, and make subsequent processing steps more efficient, thereby saving time and money. The powder removal tool 100 can be scaled and customized with no upper limit on size, fitting complex geometry with changing cross sections and non-linear paths.

Referring to FIG. 2, a first exemplary part 10a is shown with the powder removal tool 100 disposed within the interior passageway 12 defined by the interior sidewalls 14. Referring to FIG. 3, a second exemplary part 10b is shown with the powder removal tool 100 disposed within the interior passageway 12 defined by the interior sidewalls 14. Referring to FIG. 4, a third exemplary part 10c is shown with multiple (i.e., five) powder removal tools 100 disposed within four interior passageways 12 that converge into a single interior passageway 12, all of which are defined by interior sidewalls 14. As shown in FIG. 4, there may be any suitable number of powder removal tools 100 depending on the geometry of the part 10 and the number of interior passageways 12 within the part 10.

Figure 5:
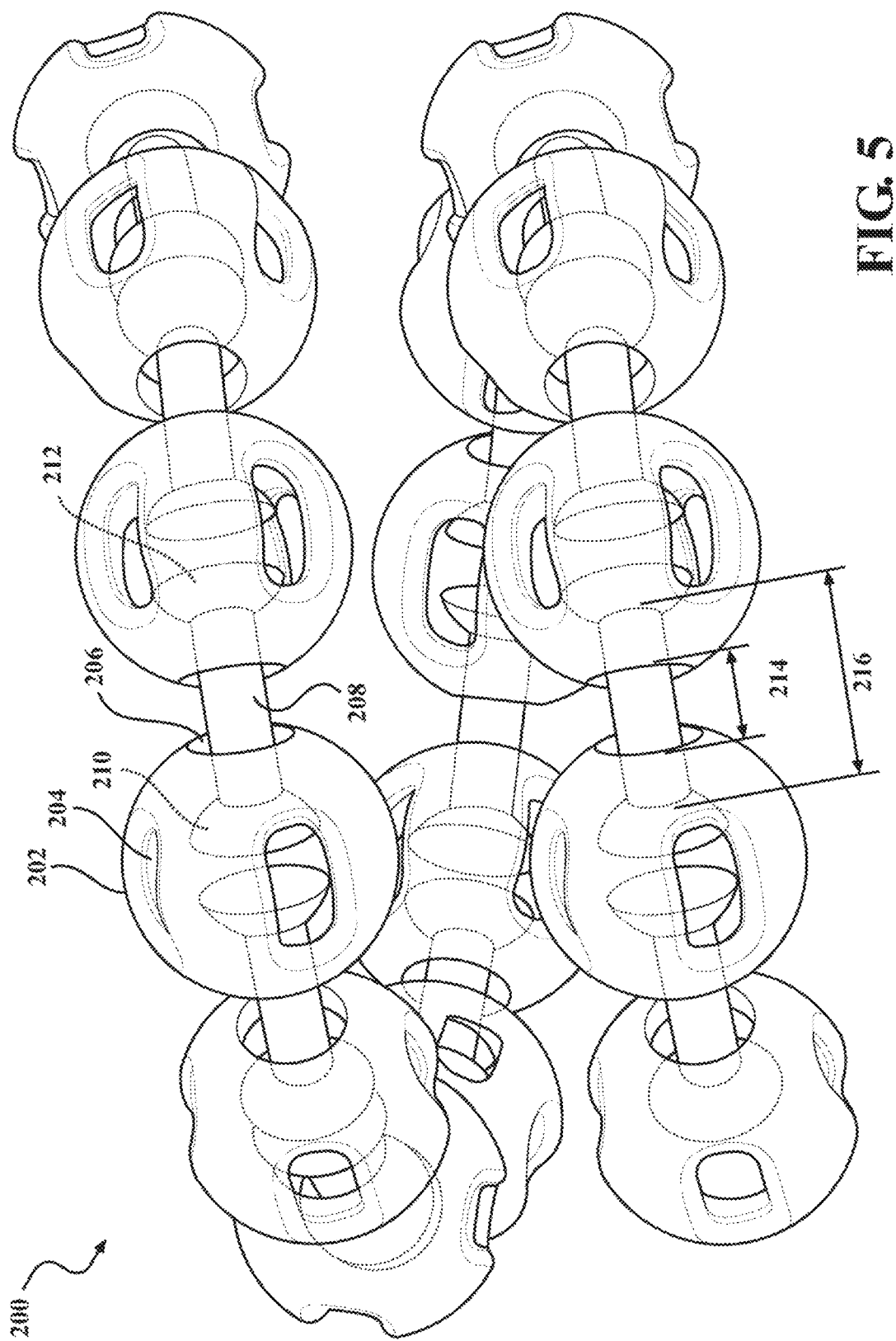
FIG. 5 is a perspective view of an exemplary powder removal tool, in accordance with the teachings of the present disclosure.

Referring to FIG. 5, a second powder removal tool 200 is generally shown. The second powder removal tool 200 may be created via additive manufacturing and operate using the same principles as the powder removal tool 100. However, as shown in FIG. 5, the second powder removal tool 200 may include a different shape and geometry than the powder removal tool 100.

Specifically, the second powder removal tool 200 may include a plurality of spherical links 202 defining one or more radial apertures 204 around the links 202 and a central cavity 206 extending through each link 202. The second powder removal tool 200 includes a linkage 208 having a first head 210 disposed at a first end and a second head 212 disposed at a second end opposite the first end of the linkage 208. The heads 210, 212 may be sized larger than the diameter of the central aperture 206, such that the heads 210, 212 prevent the linkage 208 from detaching from the links 202.

The links 202 and the linkages 208 may be printed such that a first link 202 is spaced apart from a second adjacent link 202 by a first distance 214. The heads 210, 212 may be spaced apart from one another by a second distance 216. The links 202 may move freely along the linkage 208, thereby reducing the first distance 214 to zero when adjacent links 202 contact one another. However, the heads 210, 212 prevent the links 202 from being spaced further apart than the second distance 216.

Figure 6:
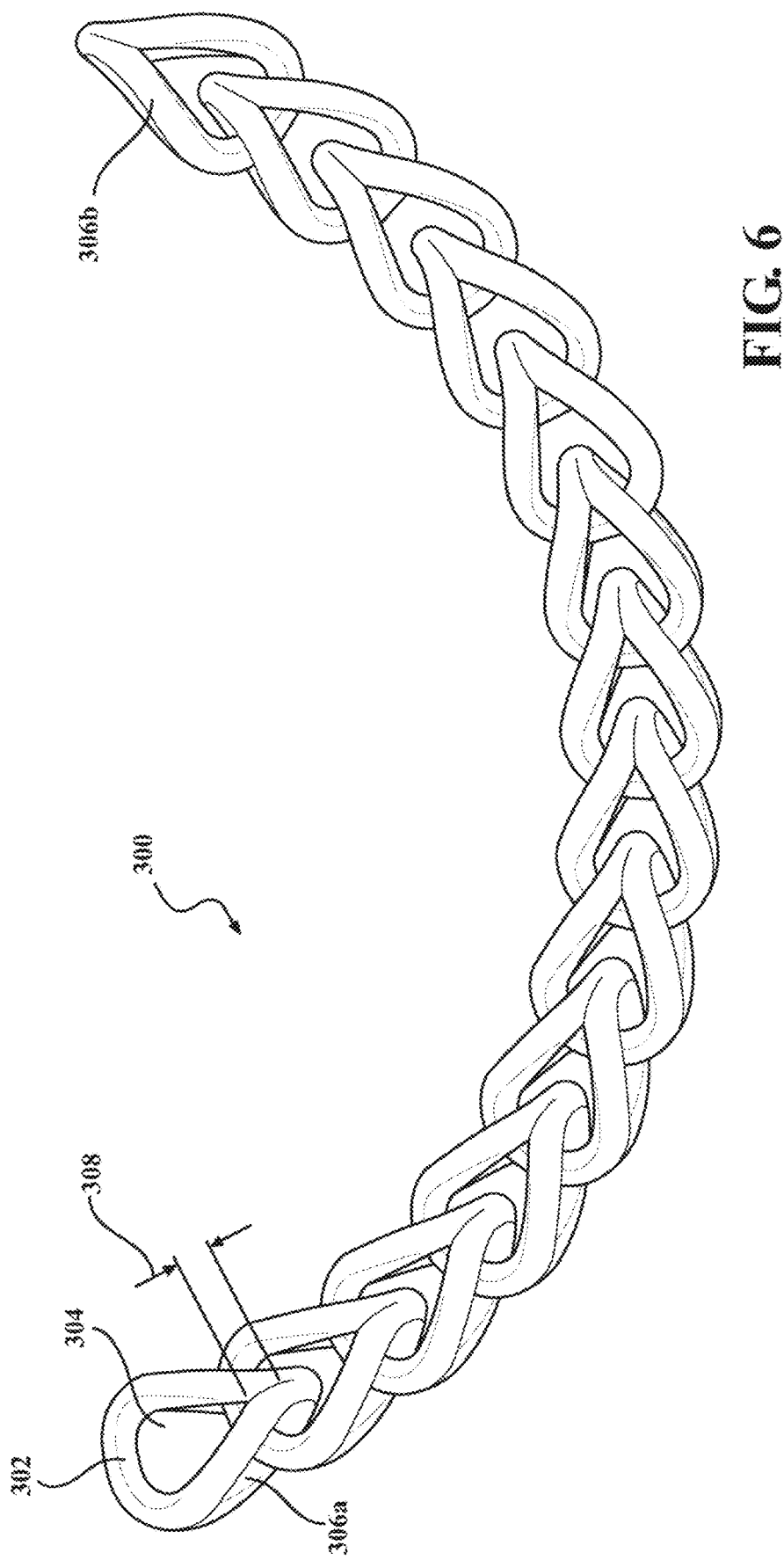
FIG. 6 is a perspective view of an exemplary powder removal tool, in accordance with the teachings of the present disclosure.

Referring to FIG. 6, a third powder removal tool 300 is generally shown. The third powder removal tool 300 may be created via additive manufacturing and operate using the same principles as the powder removal tool 100. However, as shown in FIG. 6, the third powder removal tool 300 may include a different shape and geometry than the powder removal tool 100.

Specifically, the third powder removal tool 300 includes a plurality of links 302 that define a central cavity 304, a first aperture 306a, and a second aperture 306b. The central cavity 304 extends through each link 302, and the apertures 306a, 306b extend into the central cavity 304. A first link 302 extends through the apertures 306a, 306b and into the central cavity 304 of a second adjacent link 302 to connect the first link 302 to the second link 302. The links 302 are printed with a gap 308 between adjacent links. The gap 308 prevents the links 302 from fusing with one another during the additive manufacturing process.

Figure 7:
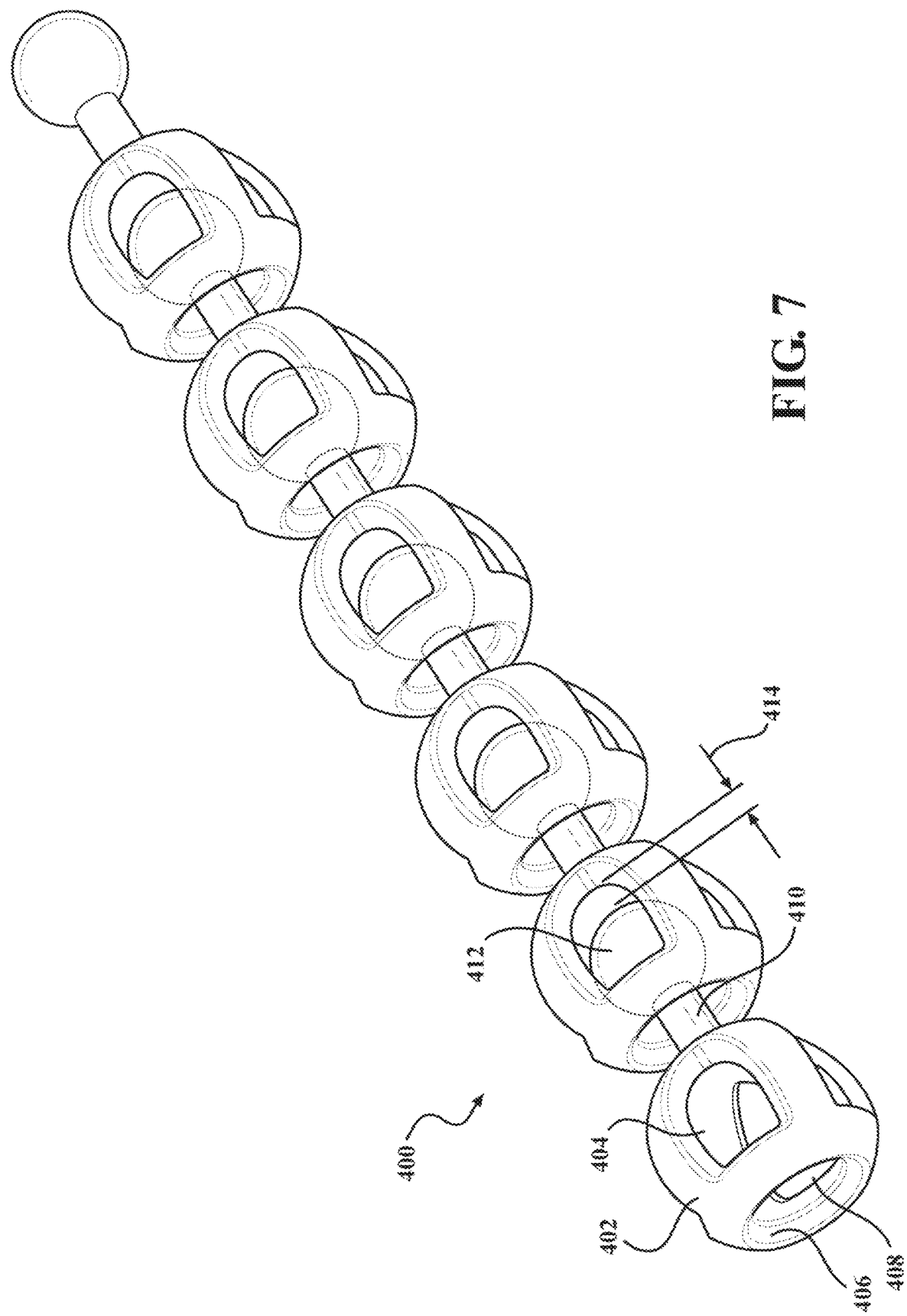
FIG. 7 is a perspective view of an exemplary powder removal tool, in accordance with the teachings of the present disclosure.

Referring to FIG. 7, a fourth powder removal tool 400 is generally shown. The fourth powder removal tool 400 may be created via additive manufacturing and operate using the same principles as the powder removal tool 100. However, as shown in FIG. 7, the fourth powder removal tool 400 may include a different shape and geometry than the powder removal tool 100.

Specifically, the fourth powder removal tool 400 may include a plurality of links 402 defining one or more radial apertures 404 and a central aperture 406 that leads to a central cavity 408. Each link 402 includes a linkage 410 and a distal ball 412 disposed at a distal end of the linkage 410 away from the link 402. Each distal ball 412 is printed within the central cavity 408 of an adjacent link 402, and the distal ball 412 is spaced from the adjacent link 402 by a gap 414. The gap 414 prevents the links 402 from fusing with one another during the additive manufacturing process.

Figure 8:
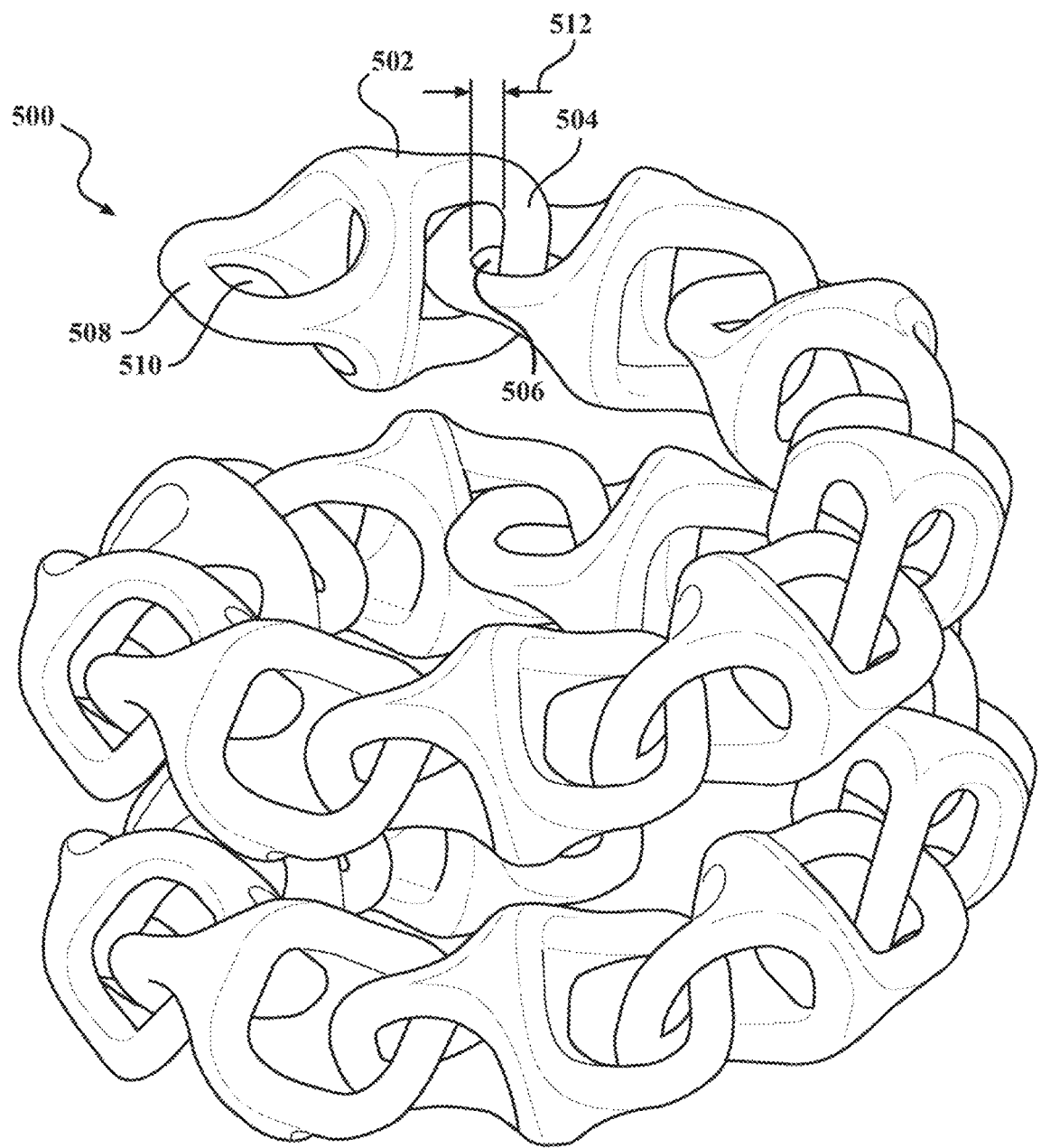
FIG. 8 is a perspective view of an exemplary powder removal tool, in accordance with the teachings of the present disclosure.

Referring to FIG. 8, a fifth powder removal tool 500 is generally shown. The fifth powder removal tool 500 may be created via additive manufacturing and operate using the same principles as the powder removal tool 100. However, as shown in FIG. 8, the fifth powder removal tool 500 may include a different shape and geometry than the powder removal tool 100.

Specifically, the fifth powder removal tool 500 includes a plurality of links 502 including a lower loop 504 defining a lower aperture 506 and an upper loop 508 defining an upper aperture 510. The upper loop 504 of one link 502 is printed such that it is disposed within the lower aperture 506 of an adjacent link 502 and spaced from the lower loop 504 by a gap 512. The gap 512 prevents the links 502 from fusing with one another during the additive manufacturing process.

Figure 9:
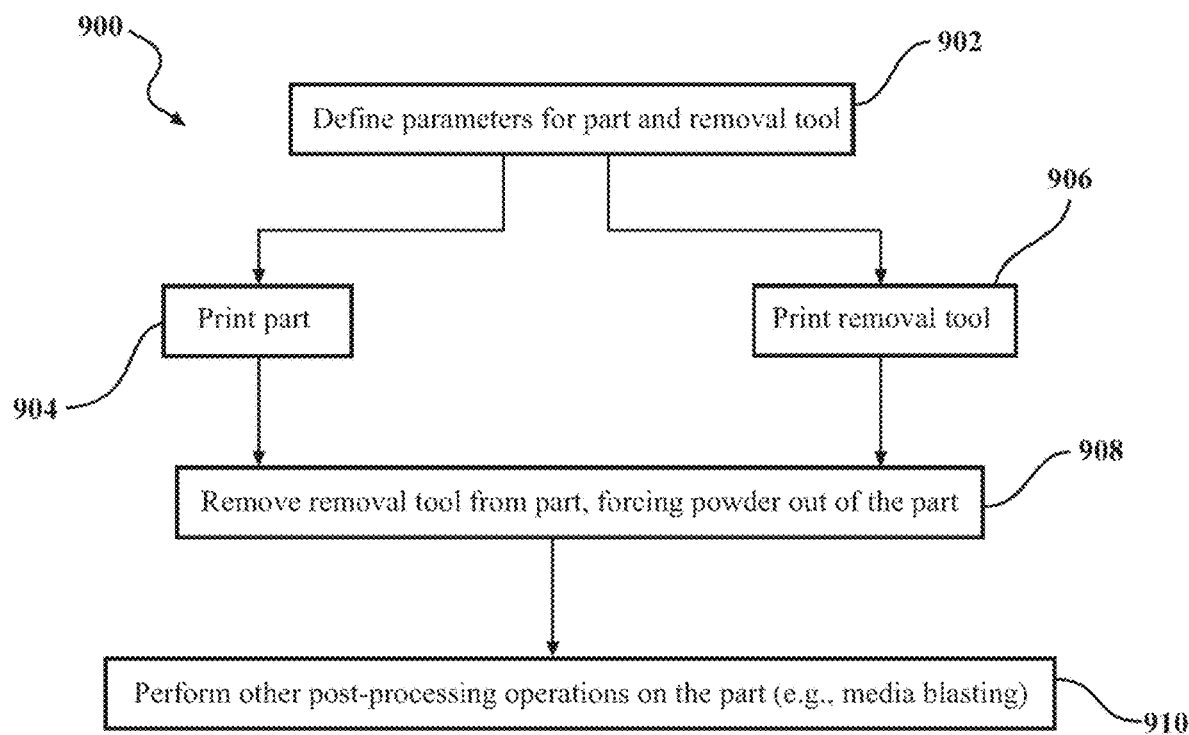
FIG. 9 is a flowchart of a process for creating the exemplary powder removal tools and parts of FIGS. 1-8, in accordance with the teachings of the present disclosure.

Referring to FIG. 9, a method 900 for creating the powder removal tools 100, 200, 300, 400, 500 and the parts 10, 10a-c is generally shown. At step 902, an additive manufacturing or printing tool defines parameters for the powder removal tool 100, 200, 300, 400, 500 and the part 10, 10a-c.

At step 904 and step 906, the additive manufacturing tool simultaneously prints the powder removal tool 100, 200, 300, 400, 500 and the part 10, 10a-c with the powder removal tool 100, 200, 300, 400, 500 being disposed within the interior passageway 12 of the part 10, 10a-c.

At step 908, a user removes the powder removal tool 100, 200, 300, 400, 500 from the particular part 10, 10a-c by pulling on the powder removal tool 100, 200, 300, 400, 500 (e.g., the chain), which removes the powder removal tool 100, 200, 300, 400, 500 from the interior passageway 12. When the powder removal tool 100, 200, 300, 400, 500 is pulled out of the interior passageway 12, it loosens excess powder within the interior passageway 12 so that the excess powder may be removed from the interior passageway 12, e.g., by inverting the part 10 so that gravity forces the excess powder out of the interior passageway 12. When the powder removal tool 100, 200, 300, 400, 500 is completely removed from the interior passageway 12, a complete open passageway is created within the interior passageway 12, e.g., both ends of the interior passageway 12 are open and capable of receiving a fluid or other material.

At step 910, a user may perform additional post-processing operations on the part, such as providing a robotic appendage that removes powder from the interior passageway 12, vibration powder removal, air blasting in the interior passageway 12, or media blasting in the interior passageway 12, to remove any remaining excess powder in the interior passageway 12. Because the powder removal tool 100, 200, 300, 400, 500 created a complete open passageway within the interior passageway 12, air or media blasting is possible within the interior passageway 12. That is, without the complete open passageway within the interior passageway 12, it is difficult for the air or media blasting to remove excess powder as the air or media does not have an outlet.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A method for removing excess powder from a part during an additive manufacturing process, the method comprising:
    defining parameters for a part;
    defining parameters for a removal tool comprising a plurality of links to create a chain-like structure, each of the links having a spherical body defining a central aperture and being joined to an adjacent link by a linkage having a first head disposed at a first end and a second head disposed at a second end opposite the first end, the first head and the second head having a larger diameter than a diameter of the central aperture;
    simultaneously creating the part and the removal tool via additive manufacturing, wherein the part defines an interior passageway and the removal tool is created within the interior passageway and, upon completion of the creation of the part and the removal tool, the removal tool is surrounded by excess powder in the interior passageway, and wherein each link of the plurality of links is created with a gap between adjacent links of the plurality of links;
    removing the removal tool from the interior passageway, forcing at least some of the excess powder out of the interior passageway; and
    performing at least one of the following operations to remove any remaining excess powder from the interior passageway:
        providing a robotic appendage for powder removal;
        vibration powder removal;
        air blasting in the interior passageway; or
        media blasting in the interior passageway.

2. The method of claim 1, wherein the part is for a vehicle.

3. The method of claim 2, wherein the vehicle is an automobile.

4. The method of claim 1, wherein the interior passageway is defined by interior sidewalls of the part, and the removal tool is spaced from the interior sidewalls.

5. The method of claim 1, wherein the first head and the second head each have a conical shape.

6. The method of claim 5, wherein the linkage includes a rod extending between the conical first head and the conical second head.

7. The method of claim 6, wherein the diameter of the first head at the rod is less than the maximum diameter of the first head and the diameter of the second head at the rod is less than the maximum diameter of the second head.

8. A method for removing excess powder from a part during an additive manufacturing process, the method comprising:
    defining parameters for a part;
    defining parameters for a removal tool comprising a plurality of links to create a chain-like structure, each of the links having a spherical body defining a central aperture and being joined to an adjacent link by a linkage having a first head disposed at a first end and a second head disposed at a second end opposite the first end, the first head and the second head having a larger diameter than a diameter of the central aperture;

simultaneously creating the part and the removal tool via additive manufacturing, wherein the part defines an interior passageway and the removal tool is created within the interior passageway; and removing the removal tool from the interior passageway, forcing at least some of the excess powder out of the interior passageway.

9. The method of claim 8, wherein the part is for an automobile.

10. The method of claim 8, further comprising performing at least one of the following operations to remove any remaining excess powder from the interior passageway:
providing a robotic appendage for powder removal;
vibration powder removal;
air blasting in the interior passageway; or
media blasting in the interior passageway.

11. The method of claim 8, wherein the interior passageway is defined by interior sidewalls of the part, and the removal tool is spaced from the interior sidewalls.

12. The method of claim 8, wherein the first head and the second head each have a conical shape.

13. The method of claim 12, wherein the linkage includes a rod extending between the conical first head and the conical second head.

14. The method of claim 13, wherein the diameter of the first head at the rod is less than the maximum diameter of the first head and the diameter of the second head at the rod is less than the maximum diameter of the second head.

15. A method for removing excess powder from a part for a vehicle during an additive manufacturing process, the method comprising:
defining parameters for a part;
defining parameters for a removal tool comprising a plurality of links to create a chain-like structure, each of the links having a spherical body defining a central aperture and being joined to an adjacent link by a linkage having a first head disposed at a first end and a second head disposed at a second end opposite the first end, the first head and the second head having a larger diameter than a diameter of the central aperture;

simultaneously creating the part and the removal tool via additive manufacturing, wherein the part defines an interior passageway and the removal tool is created within the interior passageway and, upon completion of the creation of the part and the removal tool, the removal tool is surrounded by excess powder in the interior passageway, and wherein each link of the plurality of links is created with a gap between adjacent links of the plurality of links; and removing the removal tool from the interior passageway, forcing at least some of the excess powder out of the interior passageway.

16. The method of claim 15, further comprising performing at least one of the following operations to remove any remaining excess powder from the interior passageway:
providing a robotic appendage for powder removal;
vibration powder removal;
air blasting in the interior passageway; or
media blasting in the interior passageway.

17. The method of claim 15, wherein the first head and the second head each have a conical shape.

18. The method of claim 17, wherein the linkage includes a rod extending between the conical first head and the conical second head.

19. The method of claim 18, wherein the diameter of the first head at the rod is less than the maximum diameter of the first head and the diameter of the second head at the rod is less than the maximum diameter of the second head.

20. The method of claim 19, wherein the diameter of the rod is less than the diameter of the central aperture of the links.

\* \* \* \* \*